United States Patent
Takaoka et al.

(10) Patent No.: US 7,315,491 B2
(45) Date of Patent: Jan. 1, 2008

(54) DISK DRIVING APPARATUS AND INFORMATION READOUT METHOD WITH SELECTIVE SERVO CONTROL FOR READ-OUT DESTINATIONS OF LANDS AND GROOVES

(75) Inventors: Munehisa Takaoka, Kanagawa (JP); Kazuyuki Hayashi, Kanagawa (JP)

(73) Assignee: Sony Corporation (JP)

( * ) Notice: Subject to any disclaimer, the term of this patent is extended or adjusted under 35 U.S.C. 154(b) by 762 days.

(21) Appl. No.: 10/296,750

(22) PCT Filed: Mar. 20, 2002

(86) PCT No.: PCT/JP02/02708

§ 371 (c)(1),
(2), (4) Date: Apr. 28, 2003

(87) PCT Pub. No.: WO02/080155

PCT Pub. Date: Oct. 10, 2002

(65) Prior Publication Data

US 2003/0169649 A1    Sep. 11, 2003

(30) Foreign Application Priority Data

Mar. 29, 2001 (JP) .............................. 2001-94684
Mar. 29, 2001 (JP) .............................. 2001-94685
Mar. 29, 2001 (JP) .............................. 2001-94686

(51) Int. Cl.
    *G11B 7/09* (2006.01)
(52) U.S. Cl. ................. 369/44.26; 369/44.28
(58) Field of Classification Search ............. 369/44.26, 369/44.28
    See application file for complete search history.

(56) References Cited

U.S. PATENT DOCUMENTS

| 4,926,405 | A | * | 5/1990 | Hangai et al. | ........... | 369/30.16 |
| 5,065,383 | A | * | 11/1991 | Tateishi et al. | .......... | 369/44.28 |
| 5,101,386 | A | * | 3/1992 | Kojima et al. | ........... | 369/44.28 |
| 5,138,594 | A | * | 8/1992 | Fennema et al. | ........ | 369/44.29 |
| 5,477,513 | A | * | 12/1995 | Onodera et al. | ......... | 369/44.28 |
| 5,648,947 | A | * | 7/1997 | Hamaguchi et al. | ..... | 369/44.28 |

(Continued)

FOREIGN PATENT DOCUMENTS

JP    1-128237    5/1989

(Continued)

OTHER PUBLICATIONS

International Search Report, no date.

*Primary Examiner*—Gautam R. Patel
(74) *Attorney, Agent, or Firm*—Rader Fishman & Grauer PLLC; Ronald P. Kananen (57) ABSTRACT

A disc driving apparatus and an information readout method according to the present invention realize optimum servo control of a readout unit in reading out the information from a recording medium having lands and grooves. The disc driving apparatus includes a unit for correcting tracking error signals, a unit for inverting signals corrected by the correcting unit to generate inverted tracking error signals, a unit for detecting which of the lands and the grooves the readout unit is scanning, and a unit for selecting the tracking error signals or the inverted tracking error signals according to the results of detection by the detection unit to tracking-control the readout unit by the selected signals.

15 Claims, 9 Drawing Sheets

U.S. PATENT DOCUMENTS

| | | | | |
|---|---|---|---|---|
| 5,648,954 A | * | 7/1997 | Satoh | 369/53.17 |
| 5,878,007 A | * | 3/1999 | Matsumoto et al. | 369/44.34 |
| 6,192,009 B1 | * | 2/2001 | Kim | 369/44.25 |
| 6,381,201 B1 | * | 4/2002 | Shihara et al. | 369/32.01 |
| 6,442,111 B1 | * | 8/2002 | Takahashi et al. | 369/44.28 |
| 2001/0030914 A1 | * | 10/2001 | Kim et al. | 369/44.26 |

FOREIGN PATENT DOCUMENTS

| | | |
|---|---|---|
| JP | 4-195932 | 7/1992 |
| JP | 5-67342 | 3/1993 |
| JP | 7-296394 | 11/1995 |
| JP | 7-320285 | 12/1995 |
| JP | 10-11760 | 1/1998 |

\* cited by examiner

DISK DRIVING APPARATUS AND INFORMATION READOUT METHOD WITH SELECTIVE SERVO CONTROL FOR READ-OUT DESTINATIONS OF LANDS AND GROOVES

TECHNICAL FIELD

This invention relates to a disc driving apparatus, comprised of a disc-shaped recording medium, on which the information is to be recorded or from which the information is to be reproduced, and to an information readout method.

BACKGROUND ART

Conventional compact discs (CDs) or DVD-ROMs are optical discs employing a pit recording system. An optical pickup is caused to sweep along a track including pits, and the light reflected therefrom is measured to reproduce the information recorded by the pits. Up to now, tracking error signals having the same polarity at all times are produced according to the amount of deviation of the optical pickup from a target track, so that these tracking error signals have directly been used for tracking servo control, referred to below simply as tracking control.

However, when reading out the information from an optical disc, including lands and grooves, such as DVD-RAM, the tracking error signals are inverted in polarity from the case where the read-out destination is a land to the case where the read-out destination is a groove, and vice versa, so that the tracking error signals cannot directly be used for tracking control.

In reproducing the information from an optical disc, as discussed above, "track jump" for continuously accessing the information recorded on a physically separated track is realized, with the minimum unit in the track jump operation being the transition from a given pit to an adjacent pit of the optical pickup. Meanwhile, in this jump operation, the track jump operation is completed by one period of the tracking error signals.

On the other hand, when reading out the information from an optical disc including lands and grooves, such as DVD-RAM, it may incidentally be necessary to perform a "half-track-jump operation" of continuously accessing different structural portions, such as accessing a land and a groove in this order or accessing a groove and a land in this order.

However, in such case, it is necessary to complete the half-track jump operation within one half period of the tracking error signal obtained during the track jump operation, such that there is raised a problem that a conventional control method of completing the track jump by one period of the tracking error signal cannot be directly applied.

Moreover, in an optical pickup, the distance thereof from an optical disc is controlled, according to focusing-error signals, for realizing optimum information reproduction. These focusing-error signals are corrected according to a focusing bias value, referred to below simply as a bias value, and are controlled so as to minimize the jitter of the produced RF signals.

However, in reading out the information from an optical disc including lands and grooves, such as DVD-RAM, an optimum bias value for the case where the read-out destination is the land differs from those for the case where the read-out destination is the groove, so that there is raised a problem that, if the focusing-error signals are corrected from a sole bias value, as conventionally, optimum RF signals cannot be obtained from the land and the groove.

Meanwhile, the reason why the optimum bias value for the case where the readout destination is the land differs from that for the case where the readout destination is the groove is that the distance from the optical pick-up to the land differs from that from the optical pickup to the groove.

DISCLOSURE OF THE INVENTION

It is therefore an object of the present invention to provide a disc driving apparatus and an information readout method in which optimum servo control of readout means may be achieved in information readout from a recording medium including lands and groves, such as DVD-RAM.

The above object of the present invention may be accomplished by a disc driving apparatus and an information readout method wherein tracking error signals are corrected, the signals corrected are inverted to generate inverted tracking error signals, which of the lands and the grooves the readout unit is scanning is detected, the tracking error signals or the inverted tracking error signals are selected according to the results of detection, and the readout unit is tracking-controlled by the so-selected signals.

The above object of the present invention also may be accomplished by a disc driving apparatus and an information readout method wherein the speed of movement of the readout means is diminished at a preset acceleration during a time period including a time point when the tracking error signal assumes a locally extreme value to change the scanning position of the readout means between the neighboring land and groove.

The above object of the present invention may also be accomplished by a disc driving apparatus and an information readout method wherein focusing-error signals for controlling the distance of the readout means from the recording medium are generated, a first bias value as determined according to an optimum distance when the readout means scans the land and a second bias value as determined according to an optimum distance when the readout means scans the groove are stored in advance, which of the land and the groove the readout means is scanning is detected, the first bias value or the second bias value as stored in advance in the storage means is selected according to the results of detection, the focusing-error signals as supplied are corrected by the selected bias value and the readout means is driven according to the corrected focusing-error signals to control the aforementioned distance between the readout means and the recording medium.

The main advantage of the present invention is that the scanning by the readout means may be accurately controlled by the readout means to improve the accuracy and reliability of information reproduction.

BEST MODE FOR CARRYING OUT THE INVENTION

Referring to the drawings, the disc driving apparatus and the information readout method according to the present invention will now be explained in detail. In the drawings, the same reference numerals depict the same or equivalent portions.

Figure 1:
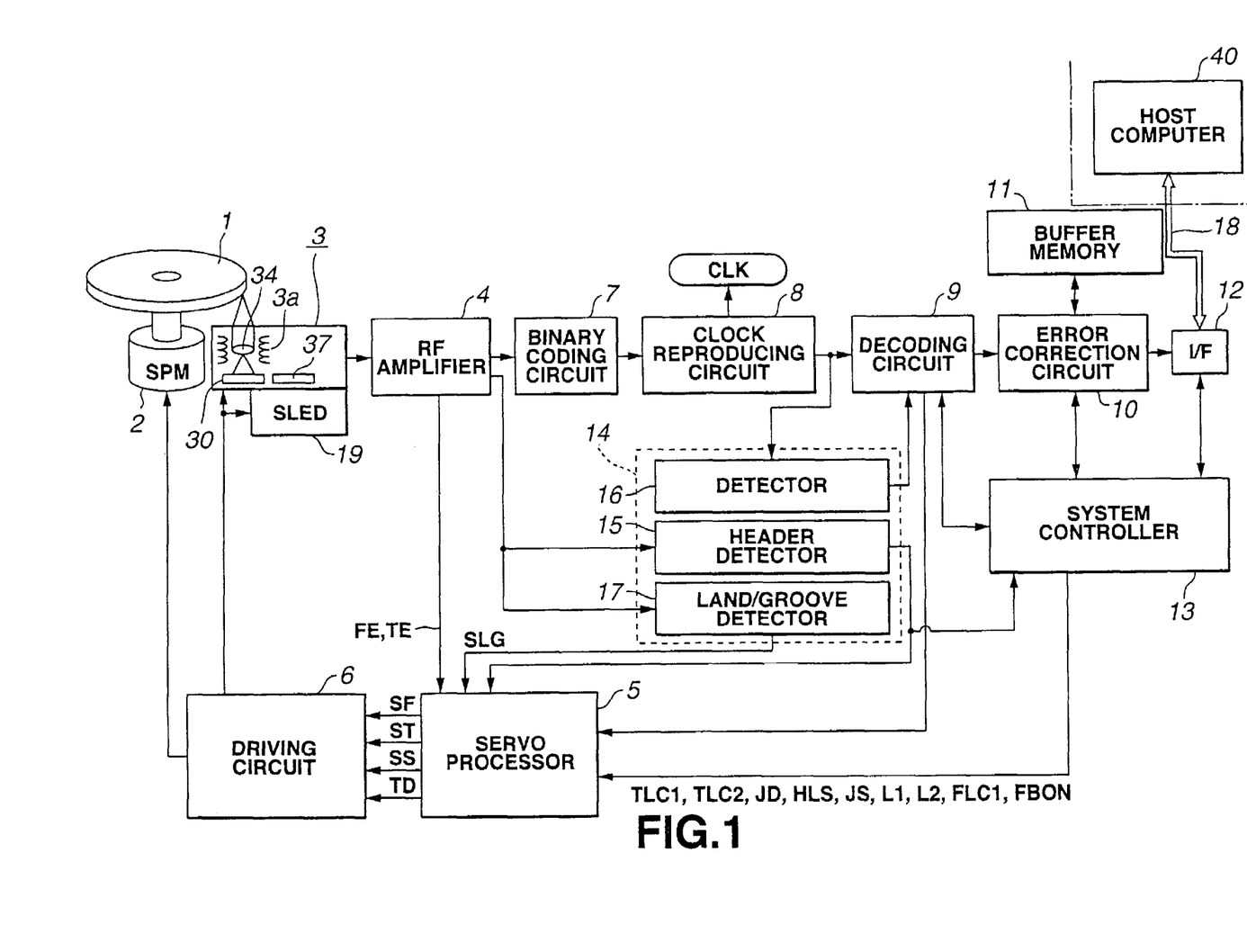
FIG. 1 is a block diagram showing an entire structure of a disc driving apparatus according to an embodiment of the present invention.

Referring to FIG. 1, a disc driving apparatus according to the first embodiment of the present invention, adapted for recording and reproducing the information for a loaded optical disc 1, includes a spindle motor (SPM) 2, an optical pickup 3, a biaxial mechanism 3a, a RF amplifier 4, a servo processor 5, a driving circuit 6, a binary coding circuit 7, a clock reproducing circuit 8, a decoder circuit 9, an error correction circuit 10, a buffer memory 11, a data interface 12, a system controller 13, a block for RAM 14, a header detector 15, a PID detector 16, a land/groove detector 17, an external data bus 18, a sled mechanism 19, a laser diode 30, an objective lens 34 and a photodetector 37, and is connected over an external data bus 18 to a host computer 40.

The spindle motor (SPM) 2 controls the rotation of a turntable carrying the optical disc 1. The optical pickup 3 illuminates a laser light beam on a signal recording surface of the optical disc 1 by the laser diode 30 and detects the light beam reflected back from the signal recording surface by the photodetector 37 to read out data recorded on the optical disc 1.

The objective lens 34 forming the optical pickup 3 collects the laser light radiated from the laser diode 30 to illuminate the collected laser light on the signal surface of the optical disc 1. This objective lens 34 is held by the sled mechanism 19 for movement along the radius of the optical disc 1.

The reflected light detected by the optical pickup 3 is turned into a current signal proportionate to the light volume and supplied in this form to the RF amplifier 4. This RF amplifier 4 performs current to voltage conversion and matrix processing to generate focusing-error signals FE and tracking error signals TE. The RF amplifier 4 also generates RF signals, as the reproduction information, and PI (pull-in) signals, as sum signals.

The focusing-error signals FE and the tracking error signals TE generated in the RF amplifier 4 are processed by the servo processor 5 with, e.g., phase compensation and gain adjustment, so as to be then supplied to the driving circuit 6. Specifically, the servo processor 5 generates sled control signals SS for track jump through an enclosed low-pass filter LPF to send the generated sled control signal to the driving circuit 6, while sending a signal SF for focusing search and a signal ST for track jump to the driving circuit 6, according to a command from the system controller 1.

The driving circuit 6 outputs the sled control signals SS for track jump as a sled drive signal to the sled mechanism 19 to execute sled servo control, while generating focusing driving signals and the tracking driving signals to output the generated focusing and tracking driving signals to the biaxial mechanism 3a to execute focusing servo control and tracking servo control. This achieves, e.g., the focusing search and tracking jump/accessing operations of the optical pickup 3.

On the other hand, the reproducing RF signals generated by the RF amplifier 4 are converted to binary signals by the binary coding circuit 7 to generate EFM PLUS signals. These EFM PLUS signals are sent to the clock reproducing circuit 8 where reproducing clock signals CLK synchronized with the EFM PLUS signals are generated on extraction. Meanwhile, these reproducing clock signals CLK are supplied as operating clocks in variegated circuits including, first of all, a decoding circuit and the servo processor 5.

The EFM PLUS signals, from which the clock signals have been extracted as described above, are sent to the decoder circuit 9 for demodulation and then sent to the error correction circuit 10. This error correction circuit 10, exploiting the buffer memory 11 as a work area, executes error correction processing in accordance with, for example, the RS-PC system. The binary-coded data, corrected for errors, are transferred to a data interfacing circuit 12.

Meanwhile, the data interfacing circuit 12 is provided for communication with an external information processing apparatus, such as a host computer 40, to which the data interface is connected over the external data bus 18. The error-free binary data (replay data), generated as described above, are sent to the host computer 40.

The system controller 13, controlling the disc driving apparatus in its entirety, is constituted by a micro-computer. This system controller controls the operations of various components based on the prevailing operating states and commands from the host computer 40.

The block for RAM 14 is provided in connection with reproduction of the DVD-RAM. The header detector 15, forming a part of the block for RAM 14, detects the timing at which the laser-light tracing point is traversing a header area of the DVD-RAM. The PID detector 16 also detects the physical address PID recorded in the header area.

In reproducing the information recorded on the DVD-RAM, it is necessary to detect whether the recording area of a sector being read out is formed in the land or in the groove and to invert the polarity of the tracking error signal TE used in tracking servo control according to the detected results. The land/groove detector 17 detects whether the area being read out is the land or the groove to generate and output a signal indicating the results of decision SLG. It is noted that the land/groove detector 17 is supplied with a push-pull signal PP generated in the RF amplifier 4, as an example.

Figure 2:
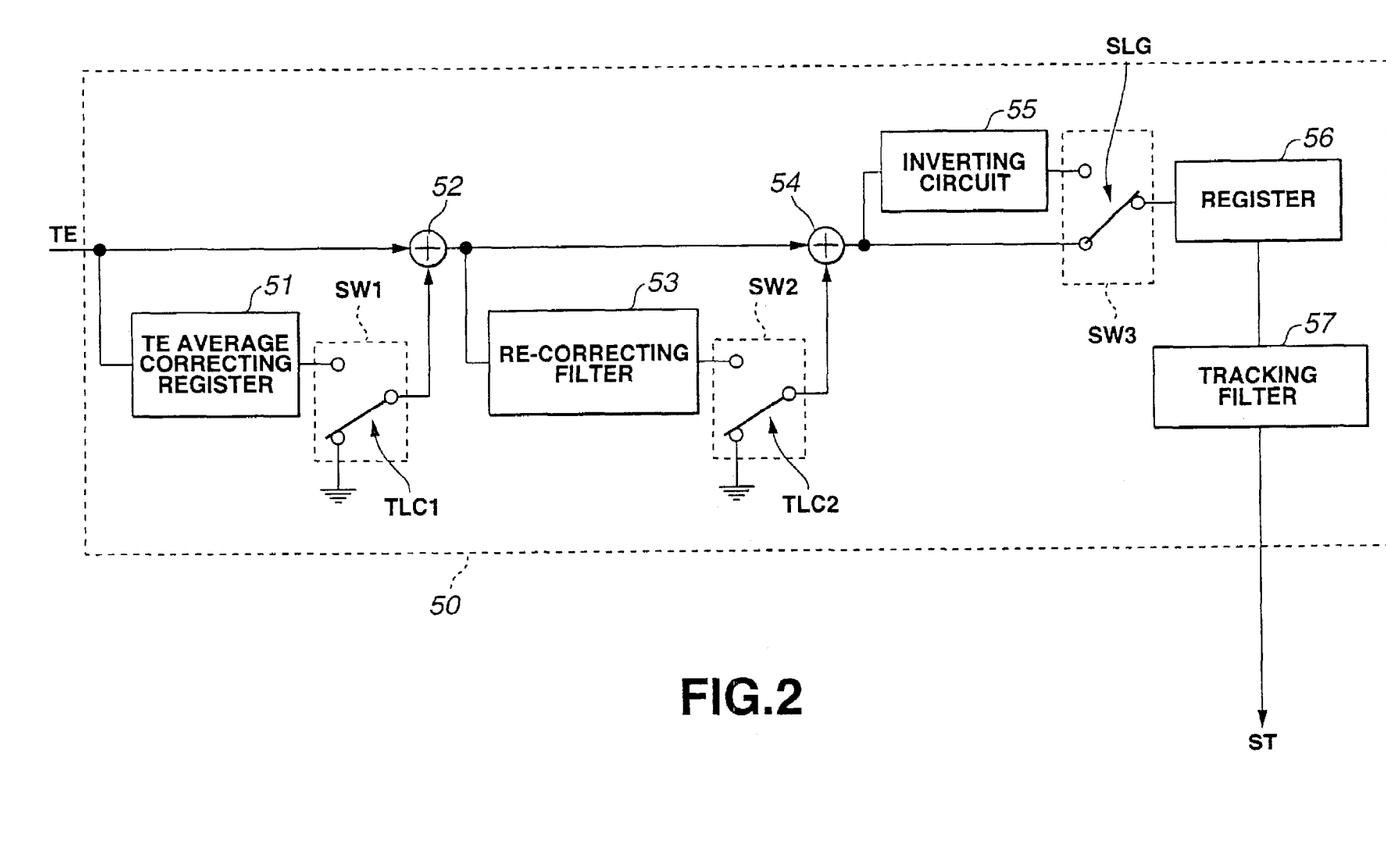
FIG. 2 is a block diagram showing the structure of a tracking correction circuit forming a part of a servo processor shown in FIG. 1.

FIG. 2 shows the structure of a tracking error correction circuit 50 forming a part of the servo processor 5 shown in FIG. 1. Referring to FIG. 2, this tracking error correction circuit 50 includes a TE averaging-correcting register 51, adders 52, 54, a re-correction register 53, an inverting circuit 55, a register 56, a tracking filter 57, and switching circuits SW1 to SW3.

To the TE averaging-correcting register 51 and to the adder 52 are sent tracking error signals TE from the RF amplifier 4. The switching circuit SW1 is provided across an output node of the TE averaging-correcting register 51 and the adder 52. An output node of the adder 52 is connected to an input node of the re-correction register 53 and to the adder 52. The switching circuit SW2 is connected across an output node of the re-correction register 53 and the adder 54.

An inverter circuit 55 is connected to an output node of the adder 54. By the switching circuit SW3, a signal generated by the adder 54 or a signal inverted by the inverting circuit 55 is selectively sent to the register 56. To the register 56 is connected the tracking filter 57, an output node of which is connected to the driving circuit 6.

The switching operations of the switching circuits SW1 to SW3 are controlled by a control signal TLC1 supplied from the system controller 13, a control signal TLC2, supplied from the system controller 13 and a signal SLG supplied from the land/groove detector 17, respectively.

The respective components of the above-described tracking error correction circuit 50, performing the processing of correcting the tracking error signals TE, are hereinafter explained.

The TE averaging-correcting register 51 samples the tracking error signals TE sent from the RF amplifier 4 at a preset period to find an average value of the signal, to calculate the deviation thereof from a preset average value. This deviation (DC offset) is cancelled by the adder 52. That is, if, for example, the ideal waveform of the tracking error signals TE is as shown by the waveform W2 of FIG. 3A, and a signal represented by the waveform W1 is obtained at the TE averaging-correcting register 51, a value L1 is obtained as an average value of the actually-measured tracking error signals TE. The adder 52 subtracts the value L1 from the original tracking error signals TE to cancel the deviation of the average value. It should be noted that the above-described correction by the above-described TE averaging-correcting register 51 is carried out as the optical pickup 3 is placed at a position lower than the position of realizing optimum information reproduction in FIG. 1.

The re-correction register 53 extracts, using an enclosed track hold filter, the low-range-frequency components in the waveform W3 of the tracking error signals TE supplied from the adder 52 to calculate the amount of deviation from the value L1 of the average value in the extracted low-frequency components. The adder 54 subtracts the amount of deviation from the tracking error signals TE to correct the tracking error signals TE. The above-described correction by the re-correcting register 53 is carried out as the optical pickup 3 is placed at a position of realizing optimum information reproduction in FIG. 1.

Thus, optimum tracking error signals TE are produced by the TE averaging-correcting register 51 and the re-correction register 53 correcting the tracking error signals TE as supplied from the RF amplifier 4. These optimum tracking error signals TE, having the waveform W3 shown in FIG. 3A, are directly supplied to the switching circuit SW3, while also being inverted by the inverting circuit 55, whereby the inverted tracking error signals, having the waveform W4 shown in FIG. 3B are sent to the switching circuits SW3.

In reproducing the optical disc 1, including lands and grooves, in both of which the information has been recorded, such as DVD-RAM, the tracking error signals TE produced are inverted in polarity for a case where the optical pickup 3 scans the lands and for a case where the optical pickup 3 scans the grooves, as described above.

Thus, in the switching circuits SW3, the tracking error signals TE or the inverted tracking error signals are selected according to the signal SLG supplied from the land/groove detector 17, and the selected signals are sent to the register 56.

Figure 3A:
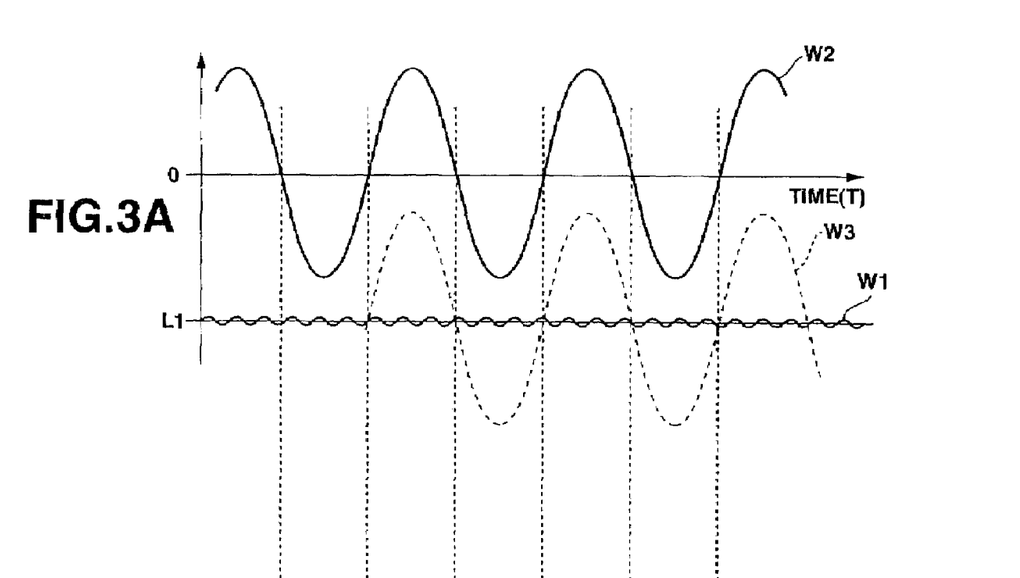
FIGS. 3A and 3B are waveform diagrams for illustrating the operation of the tracking error correction circuit shown in FIG. 2.
Figure 3B:
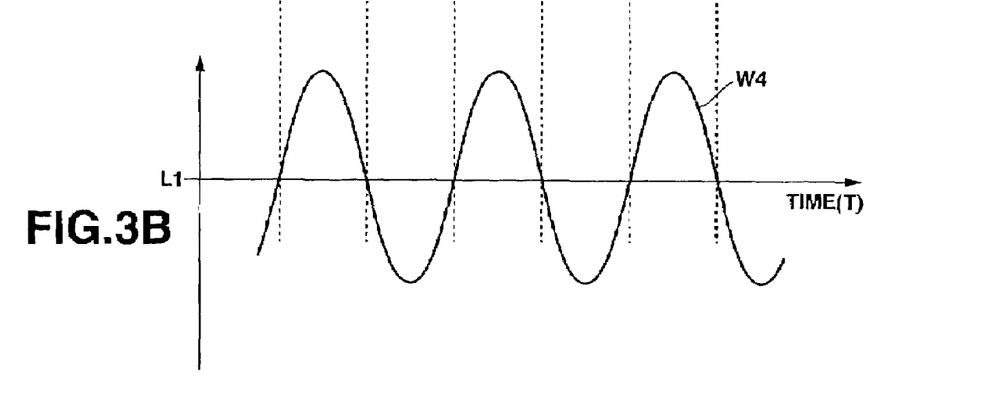

Thus, when the optical pickup 3 is scanning the lands of the optical disc 1, the signal SLG indicating that the area being scanned is the lands is sent from the land/groove detector 17 to the switching circuit SW3, so that optimum tracking error signals TE having the waveform W3 shown in FIG. 3A are sent to the register 56. If, conversely, the optical pickup 3 is scanning the grooves of the optical disc 1, the signal SLG indicating that the area to be scanned is the grooves is sent from the land/groove detector 17 to the switching circuit SW3, so that inverted tracking error signals having the waveform W4 shown in FIG. 3B are sent to the register 56.

On the other hand, the tracking error signals TE and the inverted tracking error signals supplied to the register 56 are stored in the register 56, while being sent to tracking filter 57. Meanwhile, the tracking filter 57 filters the signal supplied thereto to generate a signal ST, which signal ST is then sent to the driving circuit 6.

In the above-described embodiment of the disc driving apparatus, according to the present invention, the optimum tracking error signals TE are produced on correction by the TE averaging-correcting register 51 and the re-correcting register 53, and inverted signals of the produced optimum tracking error signals TE are generated from the optimum tracking error signals. These optimum tracking error signals TE and the inverted signals thereof are selectively used according to the area scanned by the optical pickup 3, whereby tracking control of high accuracy may be realized.

On the other hand, the servo processor 5 generates track-driving signals TD for half-track jump, according to the signals JD, HLS, JS, L1 and L2, supplied from the system controller 13, to send the generated track-driving signals TD to the driving circuit 6. This will be explained subsequently in detail.

Figure 4:
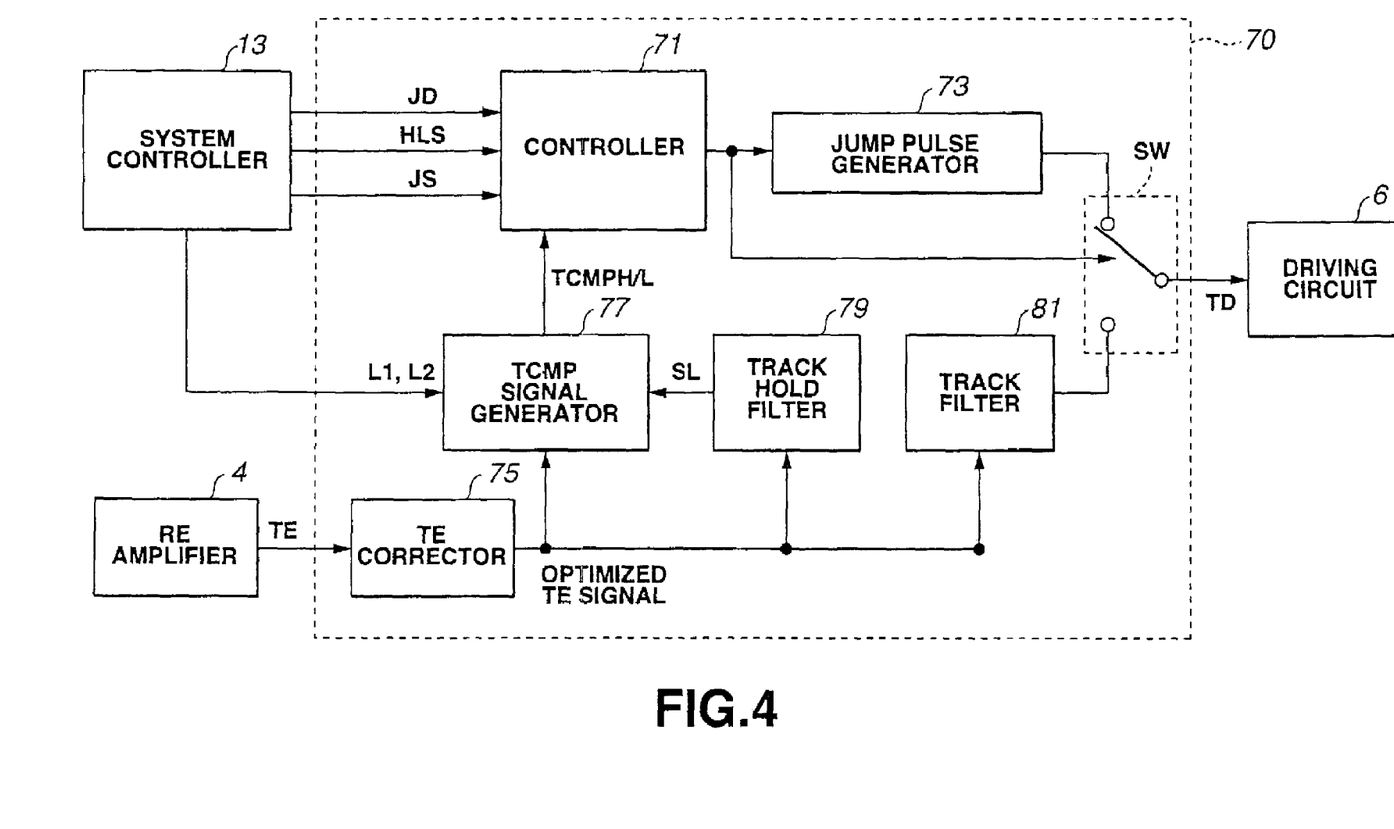
FIG. 4 is a block diagram for illustrating the structure of a half-track-jump control circuit forming a part of the servo processor shown in FIG. 1.

FIG. 4 is a block diagram showing the structure of a half-track-jump control circuit 70 forming a part of the servo processor 5. Referring to FIG. 4, the half-track-jump control circuit 70 includes a controller 71, a jump pulse generating unit 73, a TE correction unit 75, a TCMP signal-generating unit 77, a track hold filter 79, a track filter 81 and a switching circuit SW.

The controller 71 is connected to the system controller 13, while the jump pulse generating unit 73 is connected to the controller 71. The TE correction unit 75 is connected to the RF amplifier 4, while the track hold filter 79 and the track filter 81 are connected to the TE correction unit 75. The TCMP signal-generating circuit 77 has its input end connected to the system controller 13, the TE correction unit 75 and the track hold filter 79, while having its output end connected to the controller 71. The switching circuit SW has its two input ends connected separately to the jump pulse generating unit 73 and to the track filter 81, while having its output end connected to the driving circuit 6. The switching circuit SW is switching-controlled by a signal supplied from the controller 71.

In the above-described half-track-jump control circuit 70, a signal JD, which determines the direction of jump of the optical pickup 3, that is whether the jump is a forward jump or a reverse jump, or whether the jump is from the land to the groove or from the groove to the land, is supplied from the system controller 13 to the controller 71. Moreover, the system controller 13 sends to the controller 71 the signal JS commanding the start of the jump operation and a signal HLS for selecting which of the signals TCMPH and TCMPL, as later explained, are to be used for half-trackjump control, while sending signals L1 and L2, deciding on the slice level as later explained, to the TCMP signal generating circuit 77.

On the other hand, the TE correction unit 75 corrects the tracking error signals TE supplied from the RF amplifier 4 to generate optimized TE signals, which are sent to the TCMP signal generating circuit 77, the track hold filter 79 and the track filter 81. The track hold filter 79 sends a reference value SL, explained later, to the TCMP signal-generating circuit 77, while the TCMP signal-generating circuit 77 sends the generated signals TCMPH or TCMPL to the controller 71. The switching circuit SW sends the optimized signal TE, filtered by the track filter 81, as the track drive signal TD to the driving circuit 6. In a half-track-jump operation, explained in detail subsequently, the switching circuit SW, is according to the signal supplied from the controller 71, to send a signal generated by the jump pulse generating unit 73 as a track driving signal TD to the driving circuit 6.

Figures 5A, 5B:
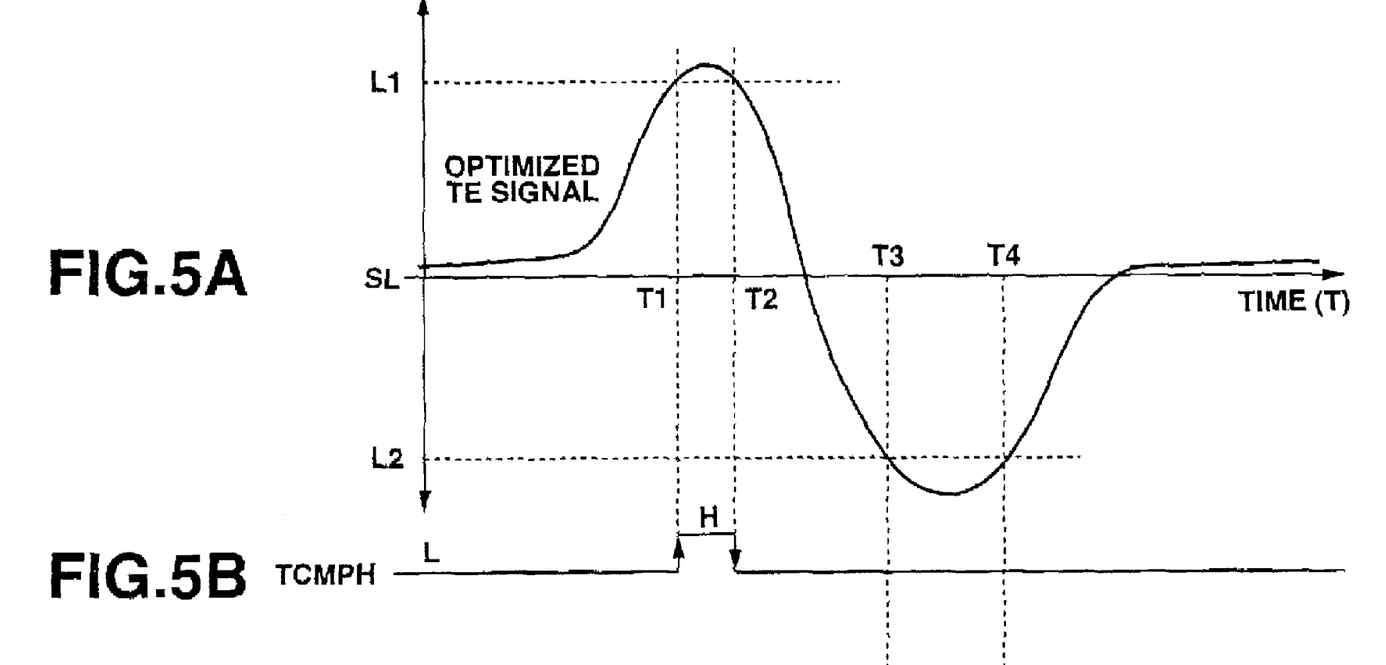
FIGS. 5A to 5C are waveform diagrams for illustrating the method for generating signals TCMPH and TCMPL by a TCMP signal-generator shown in FIG. 4.
Figure 5C:
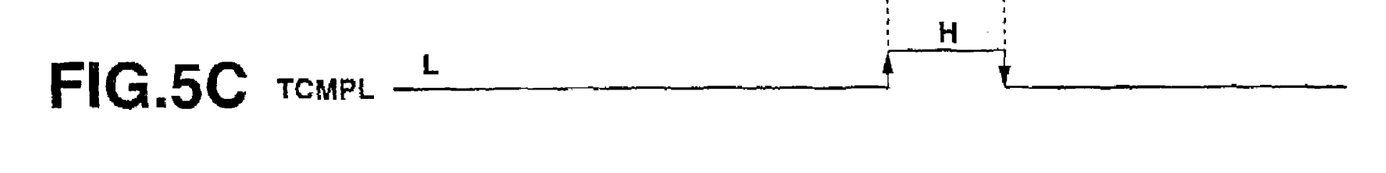

The method for generating the signals TCMPH and TCMPL by the TCMP signal-generating circuit 77 shown in FIG. 4 is explained with reference to FIG. 5. The TCMP signal-generating circuit 77 first sets the slicing levels L1 and L2 supplied from the track hold filter 79 as upper and lower threshold values, respectively, with the reference value SL supplied from the track hold filter 79 as a point of origin, as shown in FIG. 5A. The TCMP signal-generating circuit 77 monitors the optimized TE signal supplied from the TE correction unit 75, under the above scale, to generate the signal TCMPH, which goes high (H) during a time interval as from a time point T1 until a time point T2, in which the signal level surpasses the slicing level L1, as shown in FIG. 5B. The TCMP signal-generating circuit 77 also generates the signal TCMPL, which goes high (H) during a time interval as from a time point T3 until a time point T4, in which the signal level falls below the slicing level L2, as shown in FIG. 5C.

Figure 6:
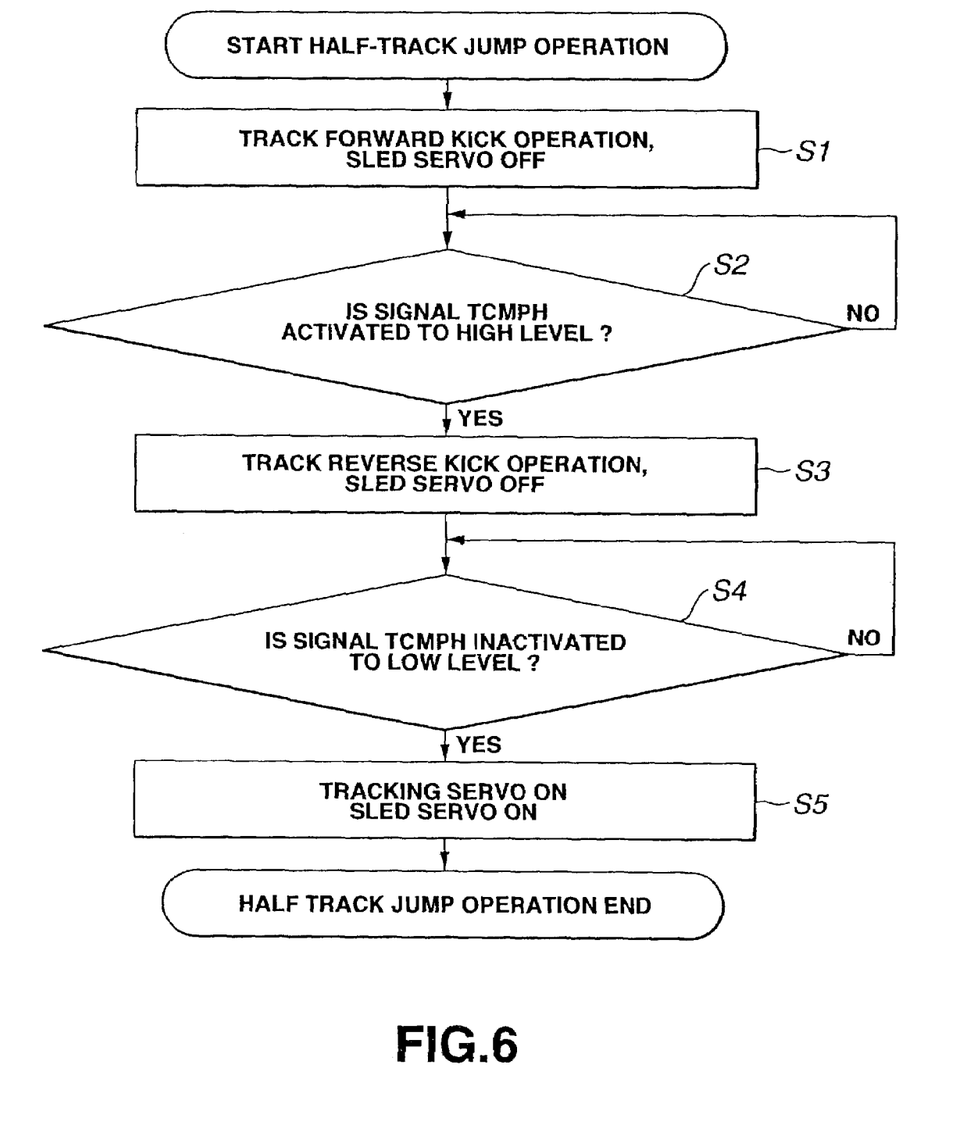
FIG. 6 is a flowchart showing the controlling method by the half-track-jump control circuit shown in FIG. 4.

The method of controlling the half-track-jump, executed by the half-track-jump control circuit 70 shown in FIG. 4, is now explained with reference to the flowchart shown in FIG. 6 and to the waveform diagram shown in FIGS. 7A to 7D.

First, the controller 71 recognizes the jumping direction according to the signal JD supplied from the system controller 13. The following description is made of a forward jump operation from a land to a groove, as an example. Meanwhile, the controller 71 is according to the signal HLS supplied from the system controller 13 to select the signal used for controlling the half-track jump operation. Here, the explanation is made for a case where the signal TCMPH has been selected.

The controller 71 is according to the signal JS supplied from the system controller 13 to start the half track jump operation. It is noted that, at step S1, the sled servo control is turned off, and forward kick is executed.

Figures 7A, 7B:
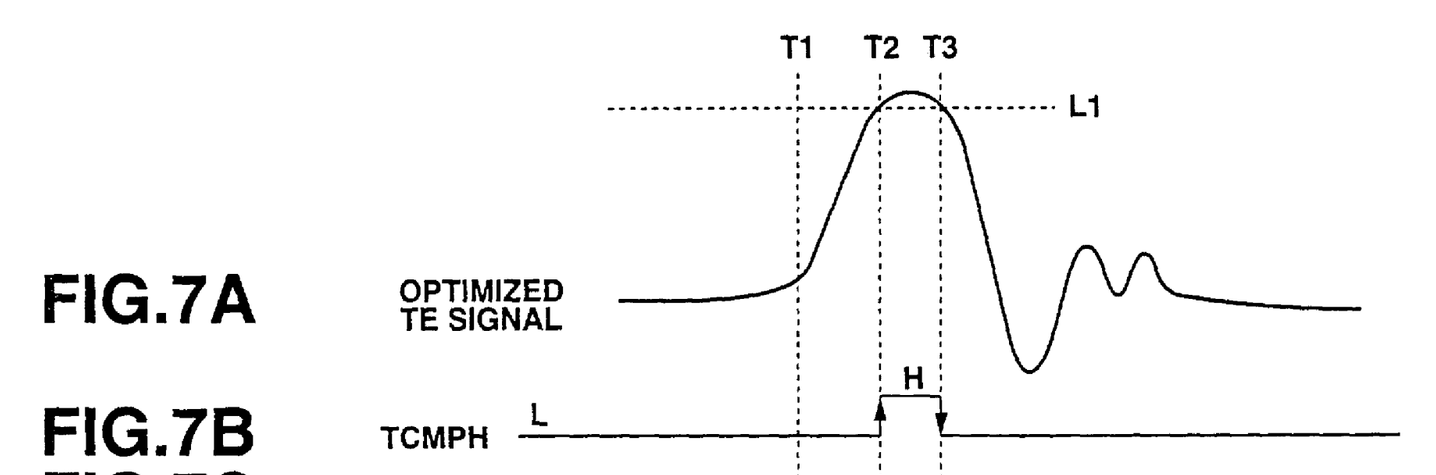
FIGS. 7A to 7D are waveform diagrams for illustrating the controlling operation performed according to the signal TCMPH by the half-track-jump control circuit shown in FIG. 4.
Figures 7C, 7D:
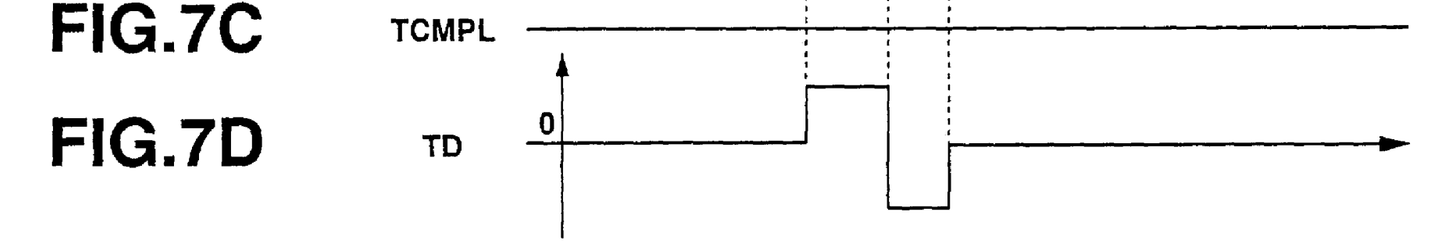

Specifically, the jump-pulse generating unit 73 is according to the signal supplied from the controller 71, to generate a jump pulse, having a positive voltage, to send the generated jump pulse to the switching circuit SW, as shown in FIG. 7D. The switching circuit SW is also, according to the signal supplied from the controller 71, to send the jump pulse as from a time point T1 to the driving circuit 6 as a track driving signal TD. The driving circuit 6 is, according to this high-level track-drive signal TD, to cause the optical pickup 3 to be moved, at a preset acceleration, from a land being currently scanned to a groove lying adjacent to the land being scanned in the direction of the increasing radius of the optical disc 1.

The controller 71, at step S2, monitors whether or not the signal TCMPH supplied from the TCMP signal-generating circuit 77 has been activated to the high level. The controller 71 proceeds to step S3 at the time point T2 when the signal TCMPH has been activated from the low level (L) to the high level (H).

At step S3, the controller 71 initiates reverse kick. That is, the jump-pulse generating unit 73 generates a jump pulse having a negative voltage, as shown in FIG. 7D. The switching circuit SW sends the jump pulse having the low level, as from the time point T2, as a track-driving signal TD to the driving circuit 6. The driving circuit 6 is then, according to this track-driving signal TD, having the low level, to diminish the speed of the optical pickup 3, being moved towards the groove, by a preset negative acceleration.

The controller 71 at step S4 monitors whether or not the signal TCMPH supplied from the TCMP signal-generating circuit 77 has been inactivated to a low level and, as shown in FIG. 7B, the controller 71 proceeds to step S5 at time point T3 when the signal has been inactivated from the high (H) level to the low (L) level.

At step S5, the controller 71 recognizes the end of the half-track-jump operation to set the track-driving signal TD to the zero level, as shown in FIG. 7D, and sets the optical pickup 3 at the center of a target groove. The controller 71 causes the switching circuit SW to output, as the track driving signal TD, the optimized TE signal filtered by the track filter 81. This allows the tracking servo control and the sled servo control to be prosecuted by the optimized TE signal that has been generated by the RF amplifier 4 and that has been filtered by the track filter 81.

FIGS. 8A to 8D show an instance where the half-track-jump direction is specified by the signals JD and HLS supplied from the system controller 13 to the controller 71, to be the direction proceeding towards the center of the optical disc 1, and where the signal TCMPL has been selected as the signal used in the half-track-jump control.

Figures 8A, 8B:
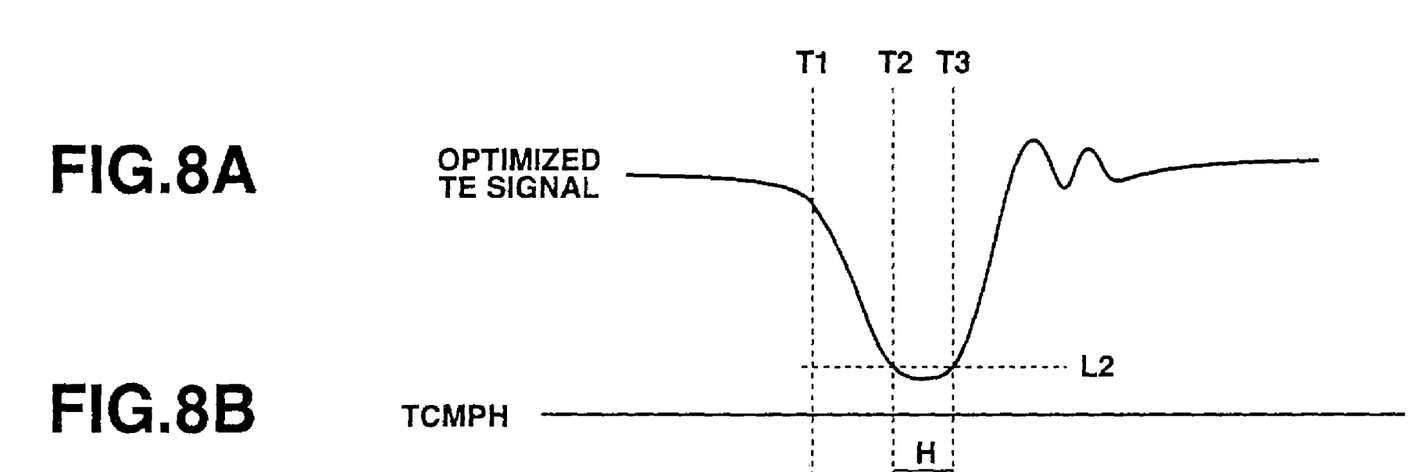
FIGS. 8A to 8D are waveform diagrams for illustrating the controlling operation performed according to the signal TCMPL by the half-track-jump control circuit shown in FIG. 4.
Figure 8C:
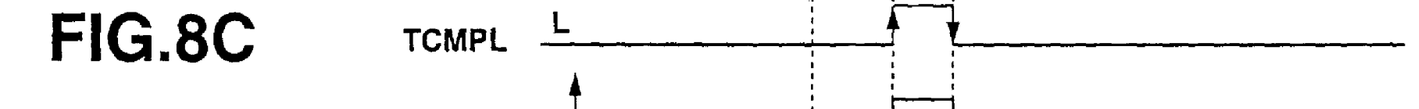
Figure 8D:
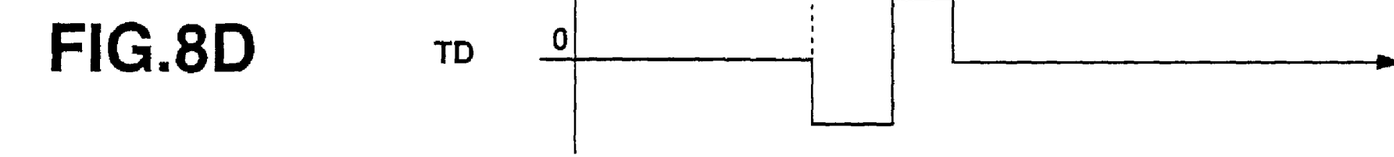

Specifically, as shown in FIG. 8D, the optical pickup 3 is moved at a preset acceleration in a direction towards the center of the optical disc (reverse kick) by the track-driving signal TD, which is of a negative voltage at time point T1. The track-driving signal TD transfers to a positive voltage, according to the signal TCMP which has been activated to the high level at time point T2 when the optimized TE signal has become lower than the slicing level L2. The speed of movement of the optical pickup 3 is then decreased by a preset negative acceleration (forward kick). At time T3 when the signal TCMPL has been inactivated to the low level, the track-driving signal TD is set to a zero level to halt the movement of the optical pickup 3 aimed to effect the half-track jump.

With the above-described disc driving apparatus, embodying the present invention, the speed of movement of the optical pickup 3 is diminished at a preset negative acceleration within a preset time period including the peak of the tracking error signal TE generated by the RF amplifier 4, whereby the optical pickup 3 can be moved to high accuracy from a given land to an adjacent groove or from a given groove to an adjacent land.

Moreover, with the above-described disc driving apparatus, embodying the present invention, in which the track-driving signal TD is generated by the tracking error signals TE generated by the RF amplifier 4, and in which the optical pickup 3 is controlled by the generated track-driving signal TD, there is no necessity for supplying needed constants from an external apparatus, such as micro-computer, in controlling the half-track jump, so that the control can be performed automatically.

In addition, with the disc driving apparatus, embodying the present invention, in which the load of the system controller 13 in controlling the half-track jump can be decreased, the information reproducing speed of the entire apparatus can be increased, while the circuitry may be reduced in size.

Furthermore, in the above-described disc driving apparatus, it is desirable to detect, in the reproduction of the information recorded on the DVD-RAM, whether the recording area of a sector being read out is the land or the groove and to correct the focusing-error signals by an optimum focusing bias value according to the results of detection. The correction of the focusing-error signals is explained hereinafter in detail.

Figure 9:
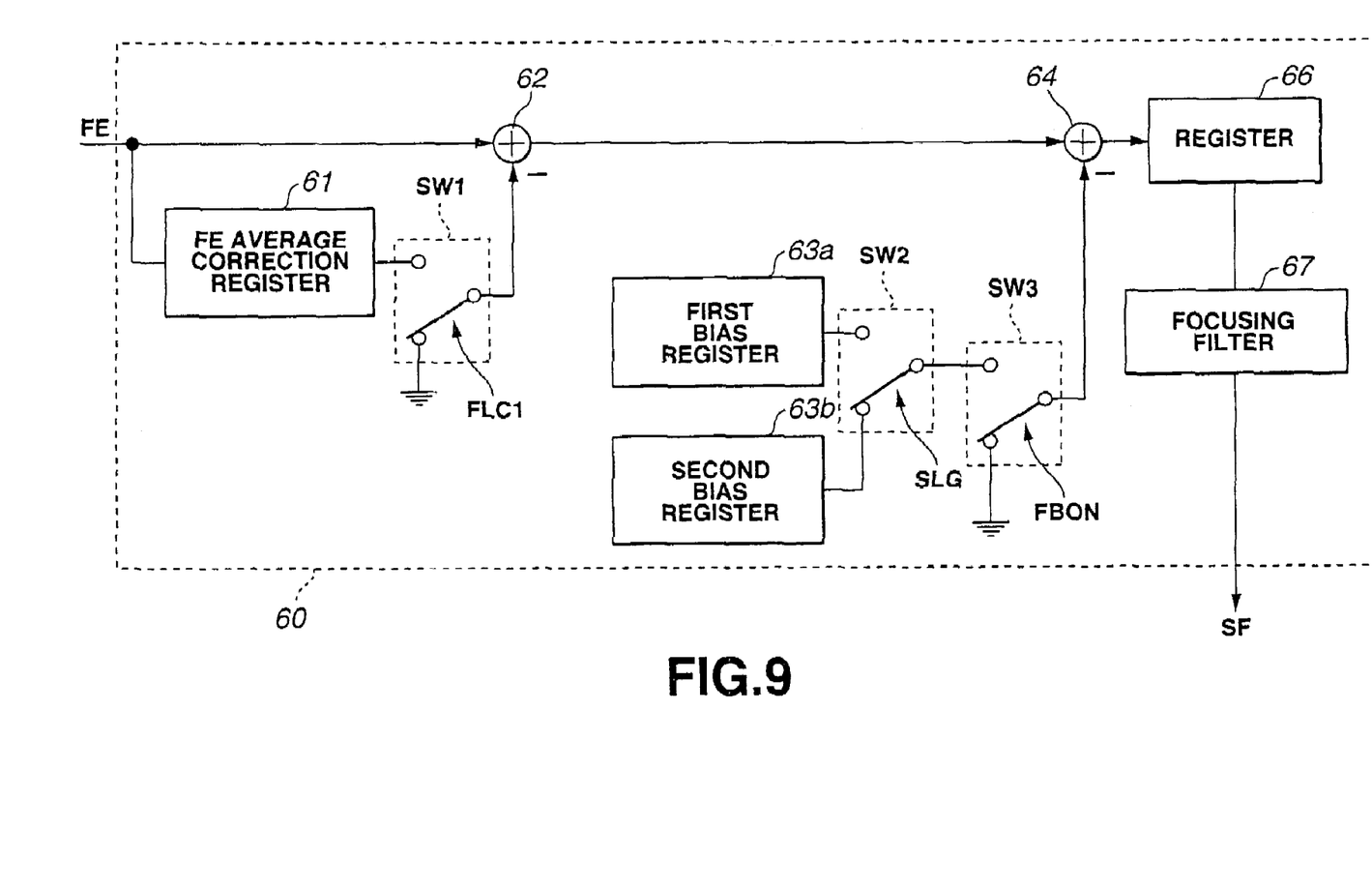
FIG. 9 is a block diagram showing the structure of a focusing-error correction circuit forming a part of the servo processor shown in FIG. 1.

FIG. 9 is a block diagram showing the structure of a focusing-error correction circuit 60 forming a part of the servo processor 5 shown in FIG. 1. Referring to FIG. 9, the focusing-error correction circuit 60 is made up of an FE average-correction register 61, adders 62, 64, a first bias register 63a, a second bias register 63b, a register 66, a focusing filter 67 and switching circuits SW1 to SW3.

The FE average-correction register 61 is fed with the focusing-error signals FE generated in the RF amplifier 4. The FE average-correction register 61 has its output node connected to the switching circuit SW1. The other input end of the switching circuit SW1 is grounded. The adder 62 is fed with the focusing-error signals FE generated in the RF amplifier 4 and with a signal output by the switching circuit SW1. The first bias register 63a and the second bias register 63b are connected to the switching circuit SW2, while the output node of the switching circuit SW2 is connected to the input node of the switching circuit SW3. The other input node of the switching circuit SW3 is grounded.

The adder 64 is supplied with a signal output by the adder 62 and with a signal output from the switching circuit SW3. To the adder 64 is connected a register 66, to which is connected a focusing filter 67. This focussing filter 67 generates a signal SF that is sent to the driving circuit 6.

The switching circuit SW1 has its switching operation controlled by the signal FLC1 supplied from the system controller 13; the switching circuit SW2 has its switching operation controlled by the signal SLG supplied from the land/groove detector 17; and, the switching circuit SW3 has its switching operation controlled by the signal FBON supplied from the system controller 13.

The above-described focusing-error correction circuit 60 is a circuit for correcting the focusing-error signals FE. The respective components making up this circuit are hereinafter explained.

The FE average-correction register 61 samples the focusing-error signals FE supplied from the RF amplifier 4 at a preset period to find an average value of the signals to calculate the deviation of the calculated average value from an as-set average value. This deviation (DC offset) is sent via the switching circuit SW1 to the adder 62, which then subtracts the DC offset from the focusing-error signals FE to cancel the deviation.

Then, as the magnitude of the bias applied to the focusing-error signals FE is changed, the amount of jitter of the RF signals measured is monitored, and the magnitude of the bias which will minimize the amount of jitter is specified. The specified bias is applied by the adder 64 to the focusing-error signals FE to generate optimum focusing-error signals.

It should be noted that the optimum value of the bias differs according to whether the optical pickup 3 scans the land or scans the groove at the time of reproducing the information. To this end, the disc driving apparatus of the present embodiment includes a first bias register 63a and a second bias register 63b, in which an optimum bias value in case the optical pickup 3 scans the land and an optimum bias value in case the optical pickup 3 scans the groove are stored, respectively, as shown in FIG. 9. The focusing-error signals FE are corrected by the optimum bias value stored in the first bias register 63a or by the optimum bias value stored in the second bias register 63b when the optical pickup 3 scans the land or the groove, respectively.

Meanwhile, the optimum bias value stored in the first bias register 63a is determined by monitoring the RF signals obtained when the optical pickup 3 actually scans the land, while the optimum bias value stored in the second bias register 63b is determined by monitoring the RF signals obtained when the optical pickup 3 actually scans the groove.

The switching circuit SW2 selects the optimum bias value stored in the first bias register 63a or in the second bias register 63b according to the signal SLG supplied from the land/groove detector 17, to send the selected optimum bias value to the switching circuit SW3. As the signal FBON supplied from the system controller 13 is activated, the switching circuit SW3 sends the bias value supplied from the switching circuit SW2 to the adder 64.

Meanwhile, the register 66 stores the focusing-error signals FE supplied thereto, while sending the focusing-error signals FE to the focusing filter 67. It is noted that the focusing filter 67 filters the signals supplied thereto to generate the signal SF, which is then sent to the driving circuit 6.

Thus, with the present embodiment of the disc driving apparatus, in case the optical pickup 3 scans the land and the groove to reproduce the information, an optimum bias can be applied to the focusing-error signals FE according to the site of scanning that is the land or the groove, thus achieving high precision RF signals.

Moreover, since plural optimum bias values can be selectively used according to the site of scanning of the optical pickup 3, it becomes unnecessary to reset the above bias value from outside the apparatus each time the site of scanning of the optical pickup undergoes transition between the land and the groove.

It should be noted that the present embodiment of the disc driving apparatus can be implemented as an apparatus for reproducing not only the DVD-RAM but also such recording mediums as DVD-ROM, CD-DA (Digital Audio) or CD-ROM, provided that the replay signal-processing systems are switched or needed reproducing parameters are changed according to the sort of the recording mediums.

INDUSTRIAL APPLICABILITY

By correcting the tracking error signals, inverting the signals resulting from the correction to generate inverted tracking error signals, detecting whether the readout means is scanning the land or is scanning the groove, selecting the tracking error signals or the inverted tracking error signals, in dependence upon the results of detection, and by tracking and controlling the readout means based on the selected signals, it becomes possible to realize optimum servo control of the readout means in information readout from a recording medium, including the lands and the grooves, formed thereon, such as DVD-RAM.

The invention claimed is:

1. A disc driving apparatus comprising:
   a tracking error signal generator adapted to generate a tracking error signal (TE), said tracking error signal (TE) indicating a deviation of a scanning position of an optical pickup; and
   a half track jump control circuit adapted to control a movement of said optical pickup through controlling an acceleration said optical pickup followed by controlling a negative acceleration said optical pickup, and adapted to control a halting of the movement of said optical pickup,
   wherein said acceleration is along a radial direction of a recording medium, a signal level of said tracking error signal (TE) at a start of said acceleration (T1) changing from a reference value (SL) toward a slicing level (L2),
   wherein said negative acceleration is along a direction opposite said radial direction, said negative acceleration being initiated (T2) when the signal level of said tracking error signal (TE) becomes less than said slicing level (L2), and
   wherein said halting follows said negative acceleration, said halting being initiated (T3) once the signal level of said tracking error signal (TE) is no longer less than said slicing level (L2).

2. The disc driving apparatus as recited in claim 1, wherein said tracking error signal generator is an RF amplifier.

3. The disc driving apparatus as recited in claim 1, wherein said slicing level (L2) is a lower than said reference value.

4. The disc driving apparatus as recited in claim 1, wherein lands and grooves are formed alternately on said recording medium in said radial direction.

5. The disc driving apparatus as recited in claim 4, wherein said scanning position is between adjacent lands.

6. The disc driving apparatus as recited in claim 4, wherein said scanning position is between adjacent grooves.

7. The disc driving apparatus as recited in claim 4, wherein information is recorded in said lands and grooves.

8. A method for reading out the information from a recording medium with lands and grooves, the method comprising the steps of:
   accelerating an optical pickup (T1) along a radial direction of a recording medium when a signal level of a tracking error signal (TE) changes from a reference value (SL) toward a slicing level (L2), and thereafter;
   negative accelerating said optical pickup (T2) along a direction opposite said radial direction when the signal level of said tracking error signal (TE) becomes less than said slicing level (L2), and thereafter;
   halting movement of said optical pickup (T3) when the signal level of said tracking error signal (TE) becomes no longer less than said slicing level (L2).

9. The method as recited in claim 8, wherein said first slicing level (L1) is a higher than said reference value.

10. The method as recited in claim 8, wherein said second slicing level (L2) is a lower than said reference value.

11. The method as recited in claim 8, wherein the lands and grooves are formed alternately on said recording medium in said radial direction.

12. The method as recited in claim 11, wherein said tracking error signal (TE) indicates a deviation of a scanning position of said optical pickup.

13. The method as recited in claim 12, wherein said scanning position is between adjacent lands.

14. The method as recited in claim 12, wherein said scanning position is between adjacent grooves.

15. The method as recited in claim 12, wherein information is recorded in said lands and grooves.

* * * * *